June 11, 1946.     P. I. GRUVER     2,401,825
TELESCOPE SIGHT MOUNT FOR FIREARMS
Filed July 17, 1943     2 Sheets-Sheet 1
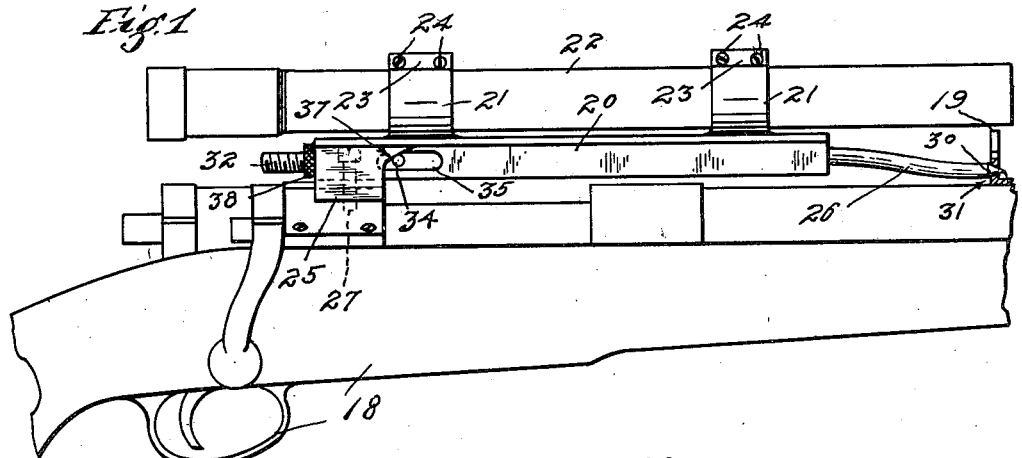
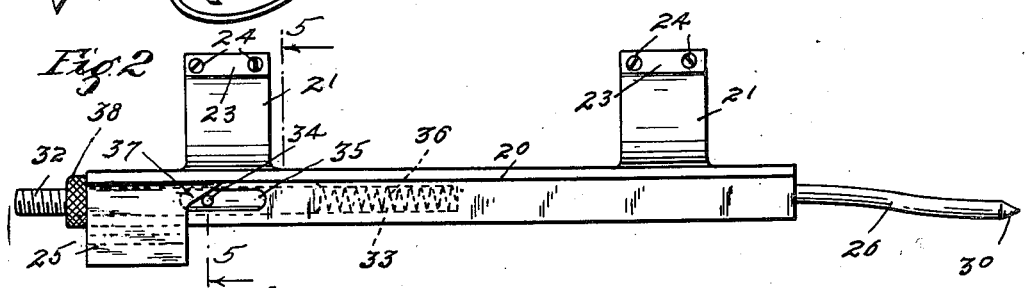
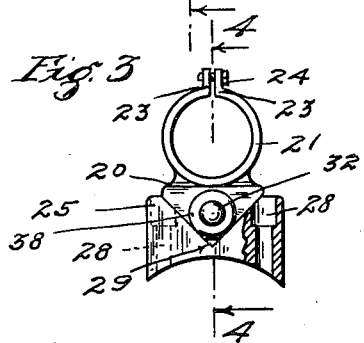
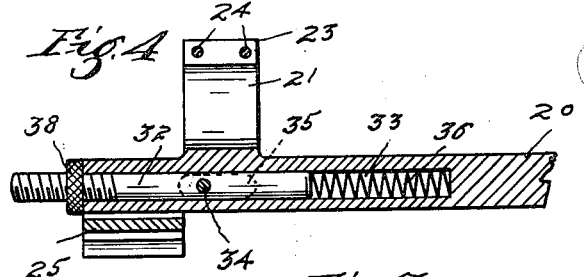
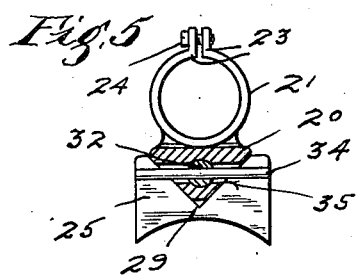
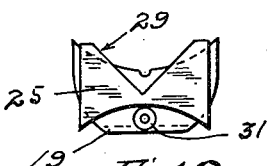
INVENTOR
Paul I. Gruver
By his Attorney
Harry N. Kilgore

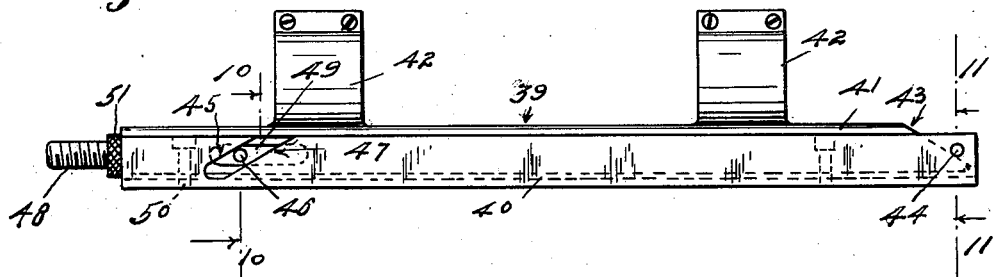
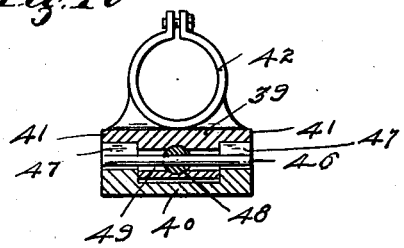
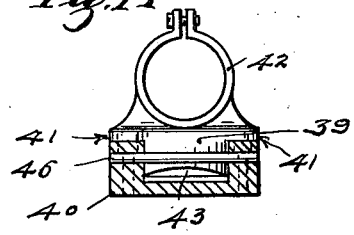
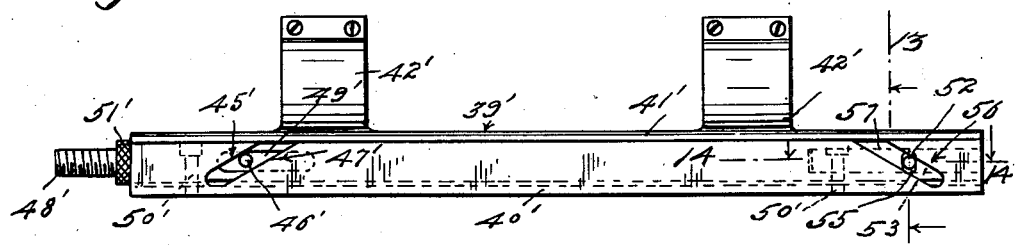
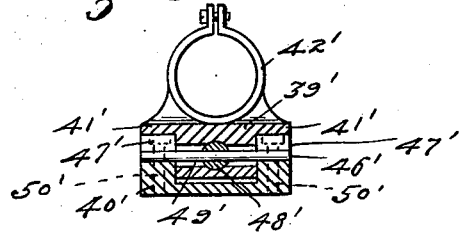
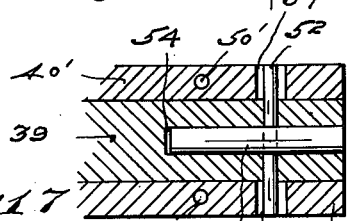
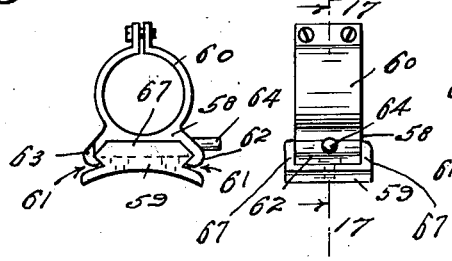
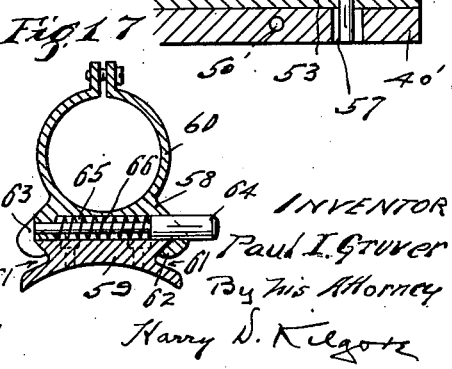

Patented June 11, 1946

2,401,825

UNITED STATES PATENT OFFICE 2,401,825

TELESCOPE SIGHT MOUNT FOR FIREARMS

Paul I. Gruver, Minneapolis, Minn.

Application July 17, 1943, Serial No. 495,389

11 Claims. (Cl. 33—50)

My invention relates to improvements in telescope sight mountings for firearms and has for its object to provide such a mount in which the telescope may be instantly attached or removed from the firearm without the use of a screwdriver or other tool or the loosening or movement of any part of the mount that would change the alignment of the telescope.

A further object of the invention is to provide a mount that will accurately and automatically align the telescope with the barrel of the firearm each time the telescope is replaced thereon.

A still further object of the invention is to provide a telescope mount in which, when the telescope is removed, the sights on the firearm are unobstructed and may be easily seen.

Other objects of the invention will be apparent from the following description, reference being had to the accompanying drawings.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 1 is a fragmentary view in side elevation of a rifle and one embodiment of the invention;

Fig. 2 is a side elevation, on an enlarged scale, of the mount body removed from the mount body base and the telescope removed from said mount body;

Fig. 3 is a left hand end elevation of the mount body, as shown in Fig. 2, mounted on the mount body base, a portion of said base being broken away and sectioned;

Fig. 4 is a view in longitudinal vertical section taken on the line 4—4 of Fig. 3;

Fig. 5 is a detail view, partly in end elevation and partly in section, taken on the irregular line 5—5 of Fig. 2;

Fig. 6 is a detail view showing the mount body base and rear sight of the rifle;

Fig. 7 shows a modification of the support for the front end of the mount body;

Fig. 8 is an end elevation of the modification shown in Fig. 7 with the mount body removed;

Fig. 9 is a view in side elevation showing another form of the invention;

Figs. 10 and 11 are views partly in end elevation and partly in section taken on the lines 10—10 and 11—11 of Fig. 9;

Fig. 12 is a view in side elevation showing a further form of the invention;

Fig. 13 is a view, partly in end elevation and partly in section, taken on the irregular line 13—13 of Fig. 12;

Fig. 14 is a fragmentary detail view principally in section taken on the line 14—14 of Fig. 12, on an enlarged scale;

Fig. 15 is still another form of the invention in end elevation;

Fig. 16 is a right hand side elevation of the invention shown in Fig. 15; and

Fig. 17 is a detail view principally in section taken on the line 17—17 of Fig. 16, on an enlarged scale.

For the purpose of showing one embodiment of the invention there is fragmentarily shown in Fig. 1 a rifle, indicated as an entirety by the numeral 18 with the exception of the rear sight 19.

Referring first in detail to the invention shown in Figs. 1 to 6, inclusive, the numeral 20 indicates a relatively long mount body that is V-shaped in cross-section. Integral with the body 20 are front and rear upstanding, endwise spaced and axially aligned clamping bands 21 for holding a telescope 22. These clamping bands 21 are divided at their tops and each thereof has a pair of upstanding, laterally spaced flanges 23 adjustably connected by a pair of screws 24. Obviously by adjusting the screws 24 the bands 21 may be frictionally clamped on the telescope 22 and thus hold said telescope accurately aligned with the barrel of the rifle 18.

The mount body 20 is removably supported at its rear end portion on a base 25 and removably supported at its front end portion on the sight 19 by a rod 26. The mount body base 25 is a relatively short block detachably but rigidly secured to the rifle 18 by screws 27 which extend through holes 28 in which the heads of said screws are countersunk.

A V-shaped channel 29 extends longitudinally through the base 25 and on the sides of said channel the correspondingly V-shaped removable rear end portion of the mount body 20 rests. The bottom of the mount body 20 is flattened to leave clearance between said body and the bottom of the channel 29 so as to permit the V-sides of the mount body 20 to rest on the V-sides of the channel 29. The surfaces between the V-sides of the mount body 20 and the channel 29 are machined for accurate fit and alignment.

One end of the rod 26 is rigidly secured to the respective end of the mount body 20 and its other end terminates in a conical point 30. This point 30 is removably seated in a correspondingly formed hole or seat 31 in the body of the rear sight 19.

The following connections are provided for holding the mount body 20 with the rod point 30 projected into the seat 31 and the rear end portion of said body coupled to the base 20, to wit: A floating plunger 32 is slidably mounted in a bore 33 which extends longitudinally into the mount body 20 at the rear end portion thereof, and a latch pin 34 extends transversely through said plunger with its end portions extending through a pair of diametrically opposite slots 35 in the sides of the mount body 20 intermediate of the ends of the bore 33. These slots 35, in which the latch pin 34 moves, permit the required endwise movement of the plunger 32 and also permit a limited lateral movement of said pin therein, and hence, a slight turning movement of the plunger 32 about its longitudinal axis. The purpose of these movements of the latch pin 34 and plunger 32 are to permit the end portions of said pin to freely engage the cam surfaces 37.

A coiled spring 36 in the bore 33 is compressed between the bottom of said bore and the inner end of the plunger 32. The end portions of the latch pin 34, which project outwardly of the mount body 20, engage the cam surfaces 37 on extensions of the front end of the base 25. Obviously, the compressed spring 36 is under strain to move the mount body 20 forwardly and thereby project the rod point 30 into the seat 31 and also move the plunger 32 rearwardly forcing the latch pin 34 against the cam surfaces 37 and thereby press or pull the mount body 20 downwardly into the V-shaped channel 29.

To prevent the plunger 32 from being depressed and thereby loosen the connection between the mount body 20 and the base 25, a lock-nut 38 is applied to the outer projecting screw-threaded end portion of the plunger 32 and impinges against the respective end of the mount body 20. The use of this lock-nut 38, is, of course, optional with the party carrying the rifle 18.

To remove the telescope 22 from the rifle 18, provided the lock-nut 38 is released, it is only necessary to press the plunger 32 inwardly, against the tension of the spring 36, sufficiently to move the latch pin 34 from under the cam surfaces 37 and then lift the telescope 22 from the base 25 and withdraw the rod point 30 from the seat 31 in the sight 19. In mounting the telescope on the rifle 18, the operation is just the reverse from that in removing the telescope 22 from the rifle.

It will thus be seen that the telescope 22 may be very quickly and easily removed from the rifle 18, without the use of a tool or the loosening of any part of the mount, when not required or when conditions are such that the telescope can not be used, such for instance during a rain, a fog, darkness, etc.

Referring now to the slight modification of the invention shown in Figs. 7 and 8, in place of the rod 26 the front end of the mount body 20', to which the clamping band 21' is secured, terminates in a conical point 30' that is removably mounted in a conical seat 31' formed in a base block 25' detachably secured to a firearm by screws, not shown.

Referring now in detail to the invention shown in Figs. 9 to 11, inclusive, the numeral 39 indicates a relatively long mount body and a correspondingly long base 40 in the form of a channel in which said mount body is removably mounted. On the sides of the mount body 39 are outturned flanges 41 which rest on the upper edges of the sides of the channel base 40. It will be noted that the under side of the mount body 39 is out of contact with the bottom of the channel base 40 so as to insure contact between the flanges 41 and the upper edges of the side of the base 40. The contacting surfaces between the sides of the mount body 39, the base 40, the flanges 41, and the upper edges of the sides of said base are accurately machined in order to hold the telescope, carried by the mount body 39, correctly aligned relative to the barrel of the rifle 18. Telescope clamping bands 42, similar to the clamping bands 21, are integral with the mount body 39.

The following connections are provided for detachably securing the mount body 39 to the base 40, to wit: the front end portion of the mount body 39 is beveled and transversely curved, as indicated at 43, and extends under a transverse pin 44 secured at its end portions to the sides of the base 40. The attachment of the rear end portion of the mount body 39 is substantially the same as that shown in Figs. 2 and 3, with the exception that the cam surfaces 45, with which the latch pin 46 engages, are formed by cutting oblique notches 47 in the sides of the base 40. Obviously, the curved contact at 43 between the mount body 39 and the pin 44 and the loose play for the latch pin 46, carried by the plunger 48, in the slots 49, relieve the mount body 39 from torque and thereby permit the mount body 39 to freely seat in the base 40. The base 40 is detachably but rigidly secured to a firearm by screws, not shown, which extend through holes 50, indicated by broken lines, in the side members of the base 40. The lock-nut on the threaded outer end portion of the plunger 48 is indicated by the numeral 51.

The invention shown in Figs. 12 to 14, inclusive, is substantially the same as that shown in Figs. 9 to 11, inclusive, with the exception of the attachment of the front end portion of the mount body to the base. Parts shown in Figs. 12 to 14, inclusive, that correspond to like parts shown in Figs. 9 to 11, inclusive, are given the same reference numerals followed by a prime.

The following connections are provided for detachably connecting the front end portion of the mount body 39' to the base 40', to wit: A second latch pin 52 extends transversely through a round bar 53 turnably mounted in a bore 54 in the respective end portion of the mount body 39'. This latch pin 52 extends through slots 55 in the mount body 39' that permit a limited turning movement of said bar about its longitudinal axis. The end portions of the latch bar 52 engage cam surfaces 56 formed by cutting oblique notches 57 in the side members of the base 40'. The oblique notches 57 are inclined in an opposite direction from the oblique notches 47', and hence the spring, exerting a force to move the mount body 39' and the plunger 48 in opposite directions, moves the latch pins 46' and 52 away from each other and thereby forces said pins against the downwardly inclined cam surfaces 45' and 56 and hold the mount body 39' firmly seated on the base 40'. The limited turning movement of the plunger 48' and the rod 53 relative to the mount body 39' insures positive contact between the latch pins 46' and 52 and the cam surfaces 45' and 56, respectively.

The invention shown in Figs. 15 to 17, inclusive, is quite similar to that shown in Figs. 1 to 8, inclusive, in that the contacting sides of the mount body 58 and base 59 are reversely inclined.

A telescope clamping band 60, similar to the clamping bands shown in the other views, is integral with the mount body 58. V-shaped grooves 61 are formed in the mount body 58 below the inclined sides thereof and hook-like clamping members 62 and 63, at the sides of the mount body 58, extend into said grooves and engage the base 59. The clamping member 62 is integral with the mount body 58 and the clamping member 63 is secured to the reduced end of a plunger 64. This plunger 64 is slidably mounted in a bore 65 which extends transversely through the mount body 58. The bore 65, at the clamping member 63, is reduced to fit the reduced end portion of the plunger 64. A coiled spring 66 in the bore 65 and encircling the reduced portion of the plunger 64 is under strain to yieldingly hold the clamping member 63 in contact with the base 59. Two of the mounts just described will be required for mounting a telescope on a firearm. Flanges 67 on the base 59 hold the mount body 58 against relative endwise sliding movement.

What I claim is:

1. In a device of the class described, a base applicable to the barrel of a firearm, a telescope mount body removably seated on the base, and means detachably connecting the body to the base including a finger-actuated spring-projected plunger carried by the body for movement axially of the barrel, a pair of diametrically opposite cam surfaces on the base laterally spaced transversely of the barrel, and a latch pin carried by the plunger transversely of the barrel with its end portions engaging the cam surfaces, whereby said body is urged toward the base.

2. In a device of the class described, a base applicable to the barrel of a firearm, a telescope mount body removably seated on the base, said base and body having coacting surfaces for automatically centering the body on the base transversely of the barrel and means detachably connecting the body to the base including a spring-projected plunger mounted in a bore in the body for movement axially of the barrel, a pair of rearwardly and downwardly inclined cam surfaces on the base between which the body extends, and a latch pin attached to the plunger transversely of the barrel with its end portions extending through slots in the body and engaging the cam surfaces, whereby said body is urged toward the base.

3. The structure defined in claim 2 in which the slots are wider than the transverse diameter of the latch pin and thereby permit limited lateral movement of the latch pin and turning movement of the plunger about its longitudinal axis.

4. The structure defined in claim 2 further including releasable means for preventing the plunger from being depressed.

5. The structure defined in claim 2 further including a lock-nut having threaded engagement with the plunger and impinging against the body.

6. In a device of the class described, a channeled base applicable to the barrel of a firearm, a telescope mount body removably seated in the base, and means detachably connecting the base to the barrel including a member applicable to said barrel and having a conical seat and a conical point on the body extending into said seat.

7. In a device of the class described, a base applicable to the barrel of a firearm having a member provided with a conical seat, a telescope mount body removably seated on the base, and means detachably connecting the base to the member including a conical point extending into the conical seat in the member.

8. In a device of the class described, a channeled base applicable to the barrel of a firearm, a telescope mount body removably mounted in the channel of said base, and means detachably connecting the body to the base including a spring-projected plunger mounted in a bore in the body for movement axially of the barrel, a pair of rearwardly and downwardly inclined cam surfaces on the base between which the plunger projects, and a latch pin attached to the plunger transversely of the barrel, said pin extending through slots in the body and engaging the cam surfaces whereby said body is urged into engagement with said base.

9. The structure defined in claim 8 in which the slots are wider than the transverse diameter of the latch pin and thereby permit a limited lateral movement of the latch pin and a limited rotary movement of the plunger.

10. In a device of the class described, a channeled base applicable to the barrel of a firearm, a telescope mount body removably mounted in the channel of said base, and means detachably connecting the body to the base including a spring-projected plunger mounted in a bore in one end of the body for movement axially of the barrel, a rod turnably mounted in a bore in the other end of the body, a latch pin attached to the plunger transversely of the barrel, a second latch pin attached to the rod transversely of the barrel, two pair of upwardly converging cam surfaces between which the plunger and the rod extend, said latch pins extending through slots in the body and engaging the cam surfaces, whereby said body is urged into engagement with said base.

11. The structure defined in claim 10 in which the slots are wider than the transverse diameter of the latch pin and thereby permit a limited lateral movement of the latch pins and a limited rotary movement of the plunger.

PAUL I. GRUVER.